United States Patent
Wänstedt et al.

(10) Patent No.: US 9,380,619 B2
(45) Date of Patent: Jun. 28, 2016

(54) PRIORITIZING PACKETS IN A NODE OF A RADIO ACCESS NETWORK BY ESTABLISHING, ON INTERCEPTED FIRST PDP CONTEXT RELATED INFORMATION, A SECOND PDP CONTEXT

(75) Inventors: Stefan Wänstedt, Luleå (SE); Hans Hannu, Luleå (SE); Jonas Pettersson, Luleå (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 49 days.

(21) Appl. No.: 14/365,045

(22) PCT Filed: Dec. 15, 2011

(86) PCT No.: PCT/EP2011/072914
§ 371 (c)(1),
(2), (4) Date: Jun. 12, 2014

(87) PCT Pub. No.: WO2013/087111
PCT Pub. Date: Jun. 20, 2013

(65) Prior Publication Data
US 2014/0301350 A1    Oct. 9, 2014

(51) Int. Cl.
*H04W 76/02*    (2009.01)

(52) U.S. Cl.
CPC .......... *H04W 76/022* (2013.01); *H04W 76/025* (2013.01)

(58) Field of Classification Search
CPC ....... H04L 29/12066; H04L 61/1511; H04L 61/3075; H04W 80/045; H04W 88/182; H04W 76/041; H04W 80/04; H04M 3/2281
See application file for complete search history.

(56) References Cited

U.S. PATENT DOCUMENTS 6,754,834 B2 *    6/2004    Miettinen et al. .................. 726/3

(Continued)

FOREIGN PATENT DOCUMENTS

| EP | 1 783 961 A1 | 5/2007 |
| WO | WO 2006/071155 A1 | 7/2006 |
| WO | WO 2011/001355 A1 | 1/2011 |
| WO | WO 2011063850 A1 * | 6/2011 |

OTHER PUBLICATIONS

International Search Report, PCT Application No. PCT/EP2011/072914, Jul. 18, 2012.

(Continued)

*Primary Examiner* — Ayaz Sheikh
*Assistant Examiner* — Debebe Asefa
(74) *Attorney, Agent, or Firm* — Patents on Demand, P.A.; Brian K. Buchheit; Scott M. Garrett

(57) ABSTRACT

A method is provided in a node in a radio access network for packet data communication in a wireless communication network, the method includes intercepting, by the node, a first PDP context message between a mobile station and a core network. The message includes PDP context related information. The interception is performed to detect the PDP context related information. The method further includes establishing, by the node, based on the intercepted PDP context related information, a second PDP context between the node and the mobile station, thus enabling prioritizing packets in the radio access network. The disclosure also concerns a corresponding apparatus.

22 Claims, 3 Drawing Sheets

(56) References Cited

U.S. PATENT DOCUMENTS

| | | | |
|---|---|---|---|
| 8,645,282 B2* | 2/2014 | Vakil et al. | 705/76 |
| 8,824,430 B2* | 9/2014 | Ioannidis | 370/338 |
| 2007/0258427 A1 | 11/2007 | Shaheen et al. | |
| 2011/0199963 A1 | 8/2011 | Shaw | |
| 2011/0235595 A1* | 9/2011 | Mehta et al. | 370/329 |
| 2012/0182940 A1* | 7/2012 | Taleb et al. | 370/328 |

OTHER PUBLICATIONS

Written Opinion of the International Searching Authority, PCT Application No. PCT/EP2011/072914, Jul. 18, 2012.

3GPP, Technical Specification, "3rd Generation Partnership Project; Technical Specification Group Services and System Aspects; General Packet Radio Service (GPRS); Service description; Stage 2 (Release 10)", 3GPP TS 23.060 V10.5,0 (Sep. 2011), 321 pp.

* cited by examiner

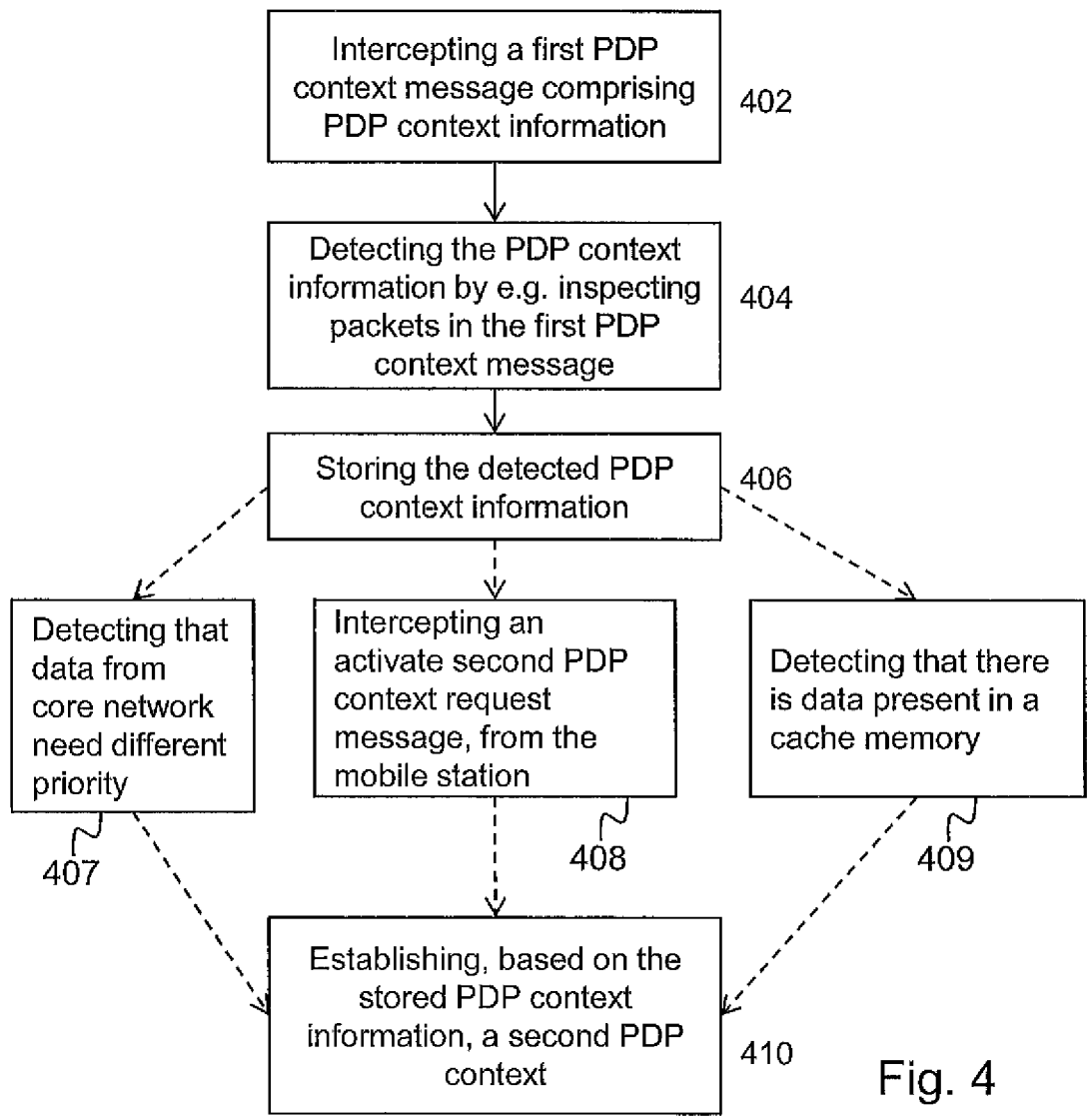

PRIORITIZING PACKETS IN A NODE OF A RADIO ACCESS NETWORK BY ESTABLISHING, ON INTERCEPTED FIRST PDP CONTEXT RELATED INFORMATION, A SECOND PDP CONTEXT

CROSS REFERENCE TO RELATED APPLICATION

This application is a 35 U.S.C. §371 national stage application of PCT International Application No. PCT/EP2011/072914, filed on 15 Dec. 2011, the disclosure and content of which is incorporated by reference herein in its entirety. The above-referenced PCT International Application was published in the English language as International Publication No. WO 2013/087111 A1 on 20 Jun. 2013.

TECHNICAL FIELD

The present disclosure relates generally to a method and an apparatus for packet data communication in a wireless communication network. More specifically, it relates to a PDP context activation in a wireless communication network.

BACKGROUND

To support packet data communication in communication networks between wireless mobile stations, even called mobile stations, in a radio network, and packet data networks, different packet-based communication technologies have been developed, such as GPRS (General Packet Radio Service), WCDMA (Wideband Code Division Multiple Access), HSPA (High Speed Packet Access) and LTE (Long Term Evolution).

For setting up a data connection between a wireless mobile station (MS) and a packet data network in a GPRS network, a GPRS attach followed by a Packet Data Protocol (PDP) context activation is performed. In the GPRS attach, the MS connects to the core network. This means that the MS is authenticated and can access GPRS services. Thereafter, when the user wants to start communicating with a packet data network, such as the Internet or an Intranet, a PDP context is activated. A PDP context defines a tunnel that is set up between the core network and the MS.

FIG. 1 shows the procedure of activating a PDP context between a mobile station 102 and the core network nodes Serving GPRS support node (SGSN) 106 and Gateway GPRS support node (GGSN) 108. The mobile station 102 is connected to the core network via a radio access network (RAN) 104. The RAN comprises a plurality of NodeBs, and Radio Networks controllers (RNC), each controlling a subgroup of the plurality of NodeBs.

An activated PDP context contains the information required to map the core network service to the radio access service, i.e. a radio access bearer (RAB) fulfilling the quality requested, and the IP address of the MS.

The PDP context activation procedure according to the 3GPP standard TS 23.060 version 10.5.0 starts by the MS 102 sending an Activate PDP context request message 1.1 to the SGSN 106. The Activate PDP context request message comprises the following parameters: Network Layer Service Access Point Identifier (NSAPI), Transaction Identity (TI), PDP Type, PDP Address, Access Point name, Quality of Service (QoS) requested, PDP configuration options, and request type. The parameter Access Point Name is used to select a reference point to a certain external packet data network and/or a service that the subscriber wishes to connect to. Access Point Name may be a logical name referring to the external packet data network that the subscriber wishes to connect to. The parameter QoS Requested indicates a desired QoS profile. The parameter PDP Configuration Options may be used to request optional PDP parameters from the GGSN.

When the SGSN 106 has received the Activate PDP context request message, it validates the Activate PDP context request using PDP Type, PDP Address, and Access Point Name provided by the MS and PDP context subscription records. Further, the SGSN selects reference point to the external network based on the Access Point Name. The SGSN also derives a GGSN address and maps the Access Point Name to the GGSN address. The SGSN creates a Tunnel Endpoint Identifier (TEID) for the requested PDP context.

Thereafter, the SGSN 106 sends a Create PDP context request message 1.2 to the GGSN 108, the request message comprising PDP Type, Access Point Name, TEID etc. The GGSN 108 then creates a new entry in its PDP context table and generates a charging ID to allow the GGSN to route PDP packet data units between the SGSN and the packet data network, and to start charging.

The GGSN then responds by sending a Create PDP context response message 1.3 back to the SGSN 106, the response message comprising TEID, PDP Type, a negotiated QoS etc. The SGSN 106 then uses the information received to set up 1.4 a Radio access bearer (RAB) from the SGSN to the MS 102.

Eventually, the SGSN 106 inserts the NSAPI, a GGSN address and the PDP address received from the GGSN in its PDP context. It also selects radio priority and packet flow ID based on QoS Negotiated, and returns an Activate PDP Context Accept message 1.5 to the MS 102, the accept message comprising PDP Type, PDP Address, TI, QoS Negotiated, radio priority, packet flow ID and protocol configuration options. The SGSN is now able to route PDP packet units between the GGSN and the MS.

In other words, when the PDP context has been set up, there is a connection between the core network and the MS over which data traffic can be sent. All data sent over this connection will have the same priority. For example, the scheduling queue in the nodeB will not make any difference between packets for prioritizing packets differently.

Although, there is an interest to prioritize data differently. For example, real-time communication, such as voice communication, needs higher priority than data communication, such as web surfing.

If, for example, a user that has an ongoing web surfing session decides to set up a voice connection, there will be two simultaneous data flows. In this case, the voice connection should have higher priority, or in other words higher Quality of Service, than the web surfing session because voice is more delay sensitive than the web surfing session. If only one PDP context is activated, all data has the same priority. It is possible to change the QoS for a PDP context, but if different data flows needing different QoS are to be transmitted more or less simultaneously it does not help changing QoS to prioritize between the two flows.

To solve this, a second PDP context can be set up having a different QoS than the first PDP context. This means that the mobile station now have two PDP contexts to the core network set up simultaneously, including having two separate radio access bearers set up between the RAN and the MS. The second PDP context can e.g. be used for voice communication and the first PDP context can e.g. be used for the web surfing session. The first and the second PDP context can be given different scheduling priorities, based on the QoS values, wherein the voice communication normally would have higher priority than the web surfing session. Such a second PDP context is set up in the same way as described above in relation to FIG. 1. Although, the activation of the second PDP context can be initiated by the network by telling the MS to start the activation PDP context activation procedure, by sending an Activate Second PDP context request message.

As shown, at least two different PDP contexts have to be set up between the core network and the mobile station for ensuring the possibility to give different priorities to different data flows to and from the mobile station.

Although, there may be reasons when the radio access network would like to be able to support different priorities to different data flows without having to involve the core network. One scenario where this could be beneficial is if the core network and the radio access network are owned by different operators. Another reason is if there is a data flow coming from a cache memory in the RAN. In the latter case, the cached data flow could be more quickly distributed if the core network is not involved.

SUMMARY

It is an object of the invention to address at least some of the problems and issues outlined above. It is another object to provide for an alternative way of prioritizing data flows to a mobile station. More specifically, it is an object to make it possible for the radio access network to support different priorities to different data flows to a mobile station without having to involve the core network. Even more specifically, it is an object to be able to set up a second PDP context to a mobile station without having to involve the core network. It is possible to achieve any of these objects and others by using a method and an apparatus as defined in the attached independent claims.

According to one aspect, a method is provided in a node in a radio access network for packet data communication in a wireless communication network, the method comprising: intercepting, by the node, a first PDP context message between a mobile station and a core network, the message comprising PDP context related information, wherein the interception is performed to detect the PDP context related information; and establishing, by the node, based on the intercepted PDP context related information, a second PDP context between the node and the mobile station, thus enabling prioritizing packets in the radio access network.

A PDP context is defined as a connection set up between the Core Network or the network node and the mobile station for sending data traffic to the mobile station. The PDP context is a context that can be used in any type of wireless data communication technology, such as GPRS, W-CDMA, HSPA or LTE. A node in the radio access network may also be called a communication node.

By performing such a method in a node in the radio access network, it is possible to set up a second PDP context from the radio access network towards the mobile station, i.e. without involving the Core Network. Thereby, it is enabled to make decisions regarding scheduling priority for data packets in the radio network, instead of in the core network. This also allows for improved Quality of Service handling when the radio access network and the core network are handled by different operators. It will also make it possible to send data stored in a cache in the radio network more quickly to the mobile station.

The arrangement may be arranged as a separate node working as PDP proxy. For example, the PDP proxy may be arranged between the RNC and the SGSN in case of a GPRS network, or in case of an LTE network between the e-NodeBs and the Serving Gateway. Alternatively, the arrangement may be placed in an existing node in the radio access network, such as a Radio Network Controller (RNC) of a W-CDMA network.

According to another aspect, an arrangement is provided in a node in a radio access network for packet data communication in a wireless communication network. The arrangement comprises an intercepting unit for intercepting a first PDP context message between a mobile station and a core network, the message comprising PDP context related information, and the interception is performed to detect the PDP context related information. The arrangement also comprises an establishing unit for establishing, based on the intercepted PDP context related information, a second PDP context between the node and the mobile station, thus enabling prioritizing packets in the radio access network.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 3 is a flow chart of a method according to an embodiment.

FIG. 4 is a flow chart of another method according to an embodiment.

DETAILED DESCRIPTION

Figure 1:
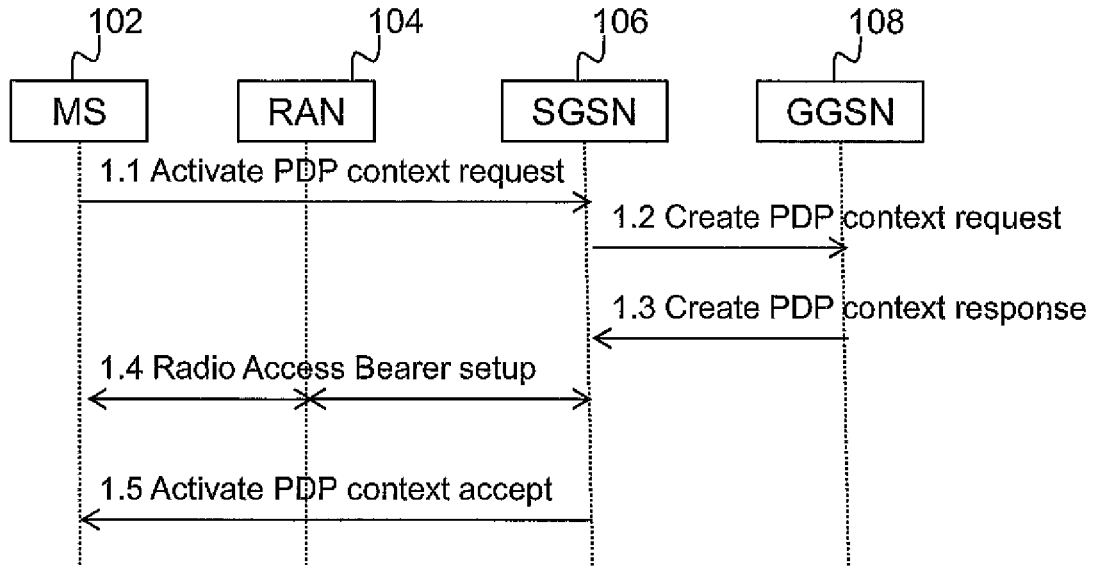
FIG. 1 is a signaling diagram illustrating a PDP context activation procedure according to the prior art.

The present disclosure is engaged with the need to set up a second PDP context to a mobile station without having to involve the core network. A second PDP context is needed for being able to prioritize between data flows to and from a mobile station in a wireless network. One scenario when it could be beneficial to set up a second PDP context without involving the core network is if the core network and the radio access network are owned by different operators. Another reason is if there is a data flow coming from a cache memory in the RAN, destined to the mobile station. In the latter case, the cached data flow could be more quickly distributed if the core network is not involved.

In this disclosure, this need is achieved by providing an arrangement that intercepts a message regarding a first PDP context setup between the mobile station and the core network to get PDP context information regarding the first PDP context. Thereafter, when a second PDP context is to be set up, establishing such a second PDP context between the radio node and the mobile station, using the intercepted PDP context information.

The arrangement may be implemented in a node that functions as a PDP proxy. The arrangement may be arranged anywhere in the radio network, either in a separate node, e.g. between an RNC and an S-GSN in a GPRS network or in an already existing node, such as an RNC.

The arrangement can detect that a second PDP context is to be set up by intercepting a second PDP context activation message from the mobile station, in which the mobile station indicates that it wants to set up a second PDP context. Alternatively, the arrangement can detect that a second PDP context is to be set up by detecting that there is data to be sent to the user in a cache memory of the radio access network. Alternatively, the arrangement can detect that a second PDP context is to be set up by intercepting data from the core network destined to the mobile station, which data indicates that a different Quality of service is needed for sending this data than what is used in the first PDP context.

When the arrangement is to set up a second PDP context activation, it sets up a Radio Access Bearer to the mobile station for the second PDP context based on the PDP context related information received in the first PDP context message and a Quality of Service value for the data to be sent in the second PDP context. This Quality of Service value can be determined e.g. from the second PDP context activation message from the mobile station, or from packet inspection of data to be sent from the core network or from inspection of data in the cache memory. Further, the arrangement sends an Activate Second PDP context accept to the mobile station comprising the necessary PDP context information for the mobile station, i.e. similar information as when an SGSN sets up a PDP context with the mobile station in the prior art.

Further, to follow the standard way of setting up a second PDP context, the arrangement may send a request to the mobile station in which request the mobile station is requested to send a request to activate a second PDP context to the network. Thereafter, the arrangement intercepts this request and sets up a radio access bearer and sends an activate PDP context accept to the mobile station.

When the second PDP context has been activated, there are from the perspective of the mobile station two PDP contexts available, but from the core network side, i.e. from the SGSN, there is only one PDP context. As mentioned, the second PDP context, hence the second priority queue in the RAN may primarily be used to transfer data that is deemed by RAN to have other priority from the data transmitted on the first PDP context, e.g. RAN cached data or data transmitted on the first PDP context from the core network that should achieve higher priority, e.g. from a core network cache or prioritized Internet traffic such as video traffic that without the present arrangement would not have different priority from other best effort traffic such as email transfers. The invention will have a large impact on performance considering that the invention will provide a means for operators of a Radio Access Network to differentiate between traffic data, i.e. give some flows better quality than other flows. Thus, the arrangement of the invention can decide to send data over the second PDP context, which have a better, provided QoS than the first PDP context.

Figure 2:
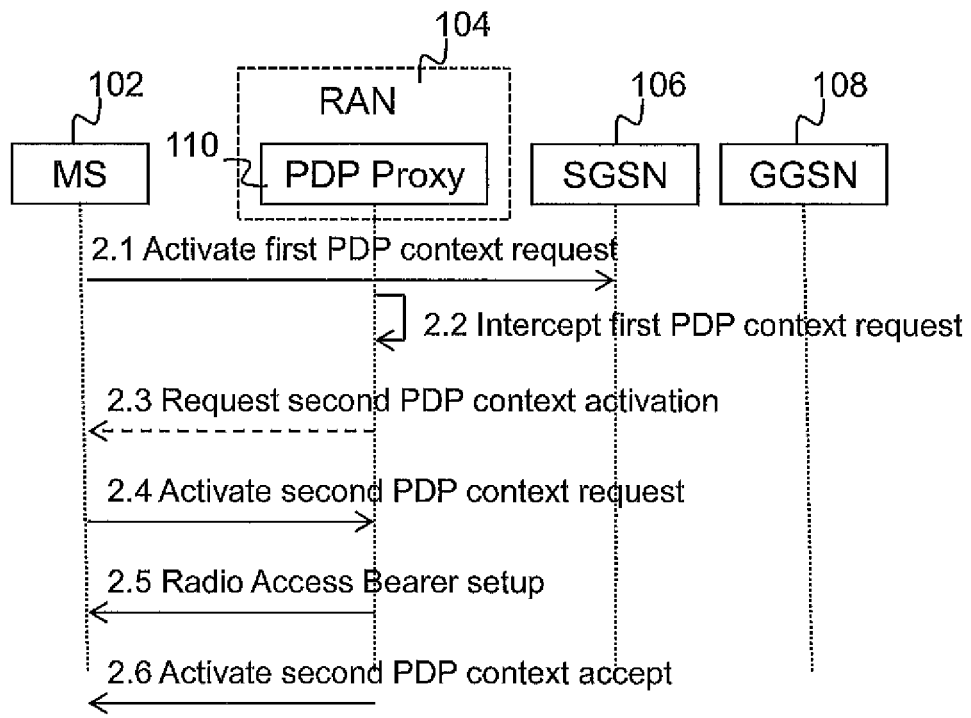
FIG. 2 is a signaling diagram illustrating a PDP context activation procedure according to a possible embodiment.

In FIG. 2 a signaling diagram is presented, illustrating a method for packet data communication according to an embodiment. The MS 102 sends 2.1 an Activate first (or primary) PDP context request to the SGSN. This message starts a procedure of setting up a first PDP context, which procedure follows the standard way of setting up a PDP context, as described in relation to FIG. 1. According to the embodiment, this request 2.1, which is directed to the SGSN 106 is intercepted 2.2 by the node of the invention, hereinafter called a PDP proxy 110, which is arranged in the RAN 104, when the request 2.1 passes through the PDP proxy 110. The PDP proxy may use packet inspection to find the information it is looking for in the request 2.1, i.e. PDP context related information, such as Network Layer Service Access Point Identifier (NSAPI), Transaction Identity (TI), PDP Type, PDP Address, Access Point name, Quality of Service (QoS) requested, PDP configuration options, and request type. Alternatively, the PDP proxy may intercept an Activate PDP context accept sent from the SGSN towards the MS instead of, or in addition to, the Activate PDP context request. The PDP proxy has now received the PDP context related information, which it can store in its memory for use when setting up a second PDP context.

The PDP proxy 110 can trigger a set up, or establishment, of a second PDP context in a number of alternative ways. One way that the PDP proxy triggers establishment is by detecting, by itself or receiving an indication, that data received from the core network should have different priority than data transferred on the first PDP context. This may be detected by inspecting the data packets passing by the PDP proxy. From this inspection the PDP proxy can decide necessary QoS, or be informed, for the data to be transferred. The PDP proxy may then decide to establish a second PDP proxy before the data is distributed to the MS 102, or, when the data passes by, the proxy 110 establishes the second PDP context and relays data to the MS 102 via the first PDP context when the second PDP context are being established. The PDP proxy may decide whether to establish a second PDP proxy based on the decided QoS.

Another alternative way to trigger establishment of a second PDP context between the PDP proxy and the MS is that the PDP proxy 110 detects that there is data present in a RAN cache memory, which data is directed to the MS 102. Such data could be e.g. cached video clips. The PDP may inspect the data in the cache to find out what kind of Quality of service such data needs for being transmitted. The cache memory may be situated in the Radio Network Controller, RNC, of a GPRS network, or in a similar network node for networks based on other technologies. Another alternative way to trigger establishment of a second PDP context between the PDP proxy and the MS is to intercept an activate second PDP context request message 2.4 received from the mobile station. By inspecting packets in the intercepted PDP context request message, the PDP proxy can find out the second PDP context information necessary for setting up this second PDP context, such as requested QoS.

A packet inspection, as mentioned above, may be carried out in the following way: The PDP proxy 110 reads the information in the packets, by utilizing the knowledge of the different messages packet structure. When it has found the right message type it processes the message/packet information to find the information needed.

When the user of the MS requests data from a source that would benefit from having a different scheduling priority, for example a RAN caching data source, the second (or secondary) PDP context activation is started. Then instead of having the SGSN/GGSN of the core network involved, the activation of the second PDP context is handled internally within the RAN by the use of the arrangement according to the invention. In the cases where the PDP proxy is triggered to establish a second PDP context based on e.g. data in a cache memory, the PDP proxy may have to send a request second PDP context activation message 2.3 to the MS asking the MS to send an activate second PDP context request 2.4. to the PDP proxy. Such a request may be necessary to follow the existing standard procedure for PDP context set up, as described in relation to FIG. 1. The request second PDP context activation message may comprise a Quality of Service value for the second PDP context. Thereafter, the second PDP context is established based on the PDP context related information received in the first PDP context message and a Quality of Service value for the second PDP context. The Quality of service value for the second PDP context may in one alternative be received from the mobile station. In another alternative the QoS value may be received from data received from the core network destined to the mobile station. In yet another alternative the QoS value may be received from data present in a cache memory of the radio access network. The second PDP context is established by setting up 2.5 a Radio Access Bearer to the mobile station for the second PDP context. Eventually, the PDP proxy sends 2.6 an Activate second PDP context accept to the MS, informing of the PDP context related information for the second PDP context.

FIG. 3 describes a method in a node in a radio access network for packet data communication in a wireless communication network. The method starts by the node intercepting 302 a first PDP context message between a mobile station and a core network, the message comprising PDP context related information, and the interception is performed to detect the PDP context related information. Thereafter, the method proceeds by establishing 304, based on the intercepted PDP context related information, a second PDP context between the node and the mobile station, thus enabling prioritizing packets in the radio access network. The node may be situated in an existing node, such as an RNC, or it may be a separate node in the Radio Access network, e.g. placed between an RNC and an SGSN.

FIG. 4 describes alternative methods in a node in a radio access network for packet data communication. This method also starts by the node intercepting 402 a first PDP context message between a mobile station and a core network, the message comprising PDP context related information. Thereafter, in the intercepted message, the PDP context related information is detected 404 by for example using packet inspection, and the detected context related information is stored 406 in a memory of the node.

Thereafter, a second PDP context may be triggered to be set up in at least three different ways. In one alternative, the node detects 407 that data received from the core network and destined to the MS need a different priority than data sent on the already established first PDP context. When this has been detected, the node may establish 410 a second PDP context using the PDP context information stored, and information of the Quality of Service needed for the detected data received from the core network.

According to another alternative, the node may intercept 408 an activate second context request message from the MS and use the PDP context information stored, together with information found in the intercepted second context request message, such as QoS for the second PDP context, to establish 410 the second PDP context.

According to yet another alternative, the node may detect 409 that there is data destined to the MS, which data is present in a cache memory in the Radio Access Network, and which data would benefit from another Quality of Service than what is used for the first PDP context. When this has been detected, the node may establish 410 a second PDP context using the PDP context information stored, and information of the Quality of Service needed for the detected data received from the core network.

Figure 5:
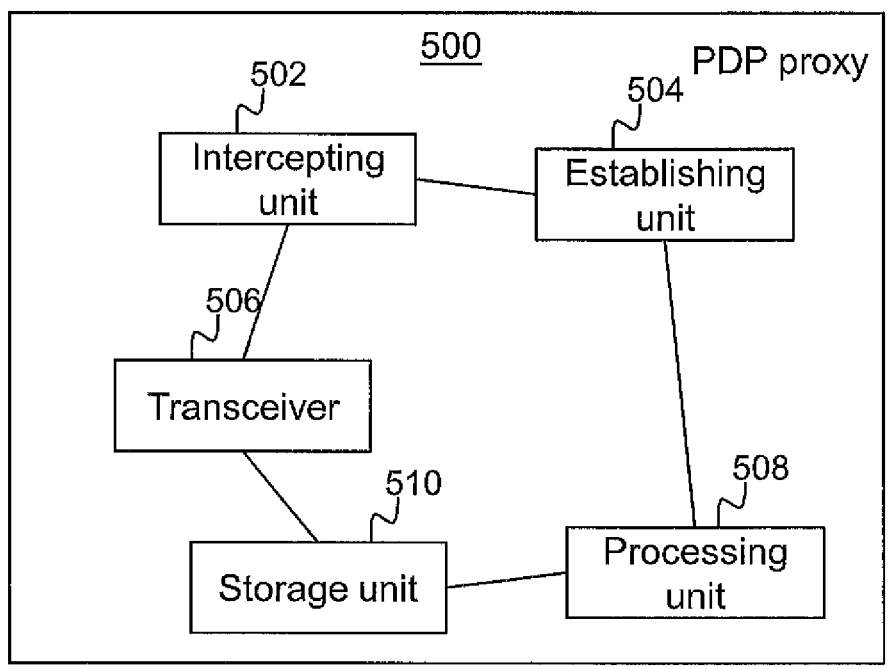
FIG. 5 is a schematic block diagram illustrating an arrangement in a node according to a possible embodiment.

FIG. 5 shows an exemplary arrangement 500 in a node of a radio access network for packet data communication. The arrangement, which may be called a PDP proxy, may either be arranged in an already existing node of the radio access network, or it may be a separate node. The arrangement comprises an intercepting unit 502, an establishing unit 504, a transceiver 506 for sending and receiving data to and from other nodes in the communication system, a processing unit 508 for processing data and a storage unit 510 for storing data. The different units are connected in any possible way. The connecting lines in the figure are only for illustrative purposes to indicate that the units are connected, and should not be interpreted such that there are only connections between the units as shown in the figure.

According to an embodiment, the intercepting unit 502 is arranged for intercepting a first PDP context message between a mobile station and a core network, the message comprising PDP context related information, wherein the interception is performed to detect the PDP context related information. Further, the establishing unit 504 is arranged for establishing, based on the intercepted PDP context related information, a second PDP context between the node and the mobile station, thus enabling prioritizing packets in the radio access network.

The intercepting unit 502 is further arranged to detect the PDP context related information by inspecting packets in the first PDP context message. The storage unit 510 is arranged for storing the PDP context related information detected in the inspection.

According to an alternative, the establishing unit 504 is further arranged to trigger establishment of the second PDP context by a detection that data received from the core network should have different priority than data transmitted on the first PDP context. According to another alternative, the establishing unit 504 is further arranged to trigger establishment of the second PDP context by a detection that there is data present in a cache memory of the radio access network. According to yet an alternative, the intercepting unit 502 is further arranged to intercept an activate second PDP context request message, comprising second PDP context related information, received from the mobile station. Also, the establishing unit 504 is arranged to trigger establishment of a second PDP context based on the second PDP context related information.

Further, the transceiver 506 may be arranged for sending a request to the mobile station to send the Activate second PDP context request message. According to another embodiment, the establishing unit 504 is arranged to establish the second PDP context based on the PDP context related information received in the first PDP context message and a Quality of Service value for the second PDP context. Further, the transceiver 506 may be arranged for receiving the Quality of service value for the second PDP context from the mobile station or for receiving the Quality of service value from data received from the core network destined to the mobile station or for receiving the Quality of Service value from data present in a cache memory of the radio access network.

Further, the processing unit 508, which in some alternatives may comprise the establishing unit 504 and the interception unit 502, is arranged for processing commands and distribute data within the PDP proxy 500. The processing unit may comprise computer readable code means for performing any of the exemplary methods described in this disclosure.

While the solution has been described with reference to specific exemplary embodiments, the description is generally only intended to illustrate the inventive concept and should not be taken as limiting the scope of the solution. For example, the terms "mobile station", and "SGSN" have been used throughout this description, although any other corresponding nodes, functions, and/or parameters could also be used having the features and characteristics described here. Further, even though the embodiments are described in terms of the GPRS packet-based communication technology, they might as well have been described for any other packed-based communication technology, such as (WCDMA (Wideband Code Division Multiple Access), HSPA (High Speed Packet Access) and LTE (Long Term Evolution). The solution is defined by the appended claims.

The invention claimed is:

1. A method in a node in a radio access network for packet data communication in a wireless communication network, the method comprising: intercepting a first Packet Data Protocol (PDP) context message between a mobile station and a core network, the message comprising PDP context related information, wherein the interception is performed to detect the PDP context related information; and establishing, based on the intercepted PDP context related information, a second PDP context between the node and the mobile station, thus enabling prioritizing packets in the radio access network, wherein the PDP context related information comprises any of the following parameters: Network Layer Service Access Point Identifier, Transaction Identity, PDP Type, PDP Address, Access Point name, Quality of Service (QoS) requested, PDP configuration options, and request type, wherein the establishment of a second PDP context is triggered by a detection that there is data present in a cache memory of the radio access network.

2. The method according to claim 1, wherein the PDP context related information is detected by inspecting packets in the first PDP context message.

3. The method according to claim 1, further comprising storing the PDP context related information in the node.

4. The method according to claim 1, wherein the step of establishing a second PDP context is triggered by detecting that data received from the core network destined to the mobile station should have different priority than data transmitted on the first PDP context.

5. The method according to claim 1, wherein the PDP context related information comprises a Network Layer Service Access Point Identifier.

6. The method according to claim 1, wherein the step of establishing a second PDP context is triggered by intercepting an activate second PDP context request message, comprising second PDP context related information, received from the mobile station.

7. The method according to claim 6, further comprising inspecting packets in the second PDP context request message to detect the second PDP context related information.

8. The method according to claim 4, further comprising sending a request to the mobile station to send the Activate second PDP context request message.

9. The method according to claim 1, wherein the PDP context related information comprises a parameter for Quality of Service (QoS) requested.

10. The method according to claim 1, wherein the second PDP context is established based on the PDP context related information received in the first PDP context message and a QoS value for the second PDP context.

11. The method according to claim 10, wherein the QoS value for the second PDP context is received from the mobile station or received from data received from the core network destined to the mobile station or received from data present in a cache memory of the radio access network.

12. The method according to claim 1, wherein the PDP context message intercepted is an Activate PDP context request message received from the mobile station and/or an Activate PDP context accept message received from a core network node.

13. An arrangement in a node in a radio access network for packet data communication in a wireless communication network, the arrangement comprising: an intercepting unit for intercepting a first Packet Data Protocol (PDP) context message between a mobile station and a core network, the message comprising PDP context related information, wherein the interception is performed to detect the PDP context related information; and an establishing unit for establishing, based on the intercepted PDP context related information, a second PDP context between the node and the mobile station, thus enabling prioritizing packets in the radio access network, wherein the PDP context related information comprises any of the following parameters: Network Layer Service Access Point Identifier, Transaction Identity, PDP Type, PDP Address, Access Point name, Quality of Service (QoS) requested, PDP configuration options, and request type, wherein the establishment of a second PDP context is triggered by a detection that there is data present in a cache memory of the radio access network.

14. The arrangement according to claim 13, wherein the intercepting unit is further arranged to detect the PDP context related information by inspecting packets in the first PDP context message.

15. The arrangement according to claim 13, further comprising a storage unit for storing the PDP context related information in the node.

16. The arrangement according to claim 13, wherein the establishing unit is arranged to trigger establishment of a second PDP context by a detection that data received from the core network should have different priority than data transmitted on the first PDP context.

17. The arrangement according to claim 13, wherein the PDP context related information comprises a Network Layer Service Access Point Identifier.

18. The arrangement according to claim 13, wherein intercepting unit is further arranged to intercept an activate second PDP context request message, comprising second PDP context related information, received from the mobile station, and wherein the establishing unit is arranged to trigger establishment of a second PDP context based on the second PDP context related information.

19. The arrangement according to claim 13, comprising a transceiver for sending a request to the mobile station to send the Activate second PDP context request message.

20. The arrangement according to claim 13, wherein the establishing unit is further arranged to establish the second PDP context based on the PDP context related information received in the first PDP context message and a Quality of Service (QoS) value for the second PDP context.

21. The arrangement according to claim 20, comprising a transceiver for receiving the QoS value for the second PDP context from the mobile station or receiving the QoS value from data received from the core network destined to the mobile station or receiving the QoS value from data present in a cache memory of the radio access network.

22. A computer program product, comprising computer readable code means, which when run in a processing unit of a node in a radio access network for packet data communication causes the node to: intercept a first Packet Data Protocol (PDP) context message between a mobile station and a core network, the message comprising PDP context related information, wherein the interception is performed to detect the PDP context related information; and establish, based on the intercepted PDP context related information, a second PDP context between the node and the mobile station, thus enabling prioritizing packets in the radio access network, wherein the PDP context related information comprises any of the following parameters: Network Layer Service Access Point Identifier, Transaction Identity, PDP Type, PDP Address, Access Point name, Quality of Service (QoS) requested, PDP configuration options, and request type, wherein the establishment of a second PDP context is triggered by a detection that there is data present in a cache memory of the radio access network.

* * * * *